(12) United States Patent  
Becicka et al.

(10) Patent No.: US 9,279,235 B1  
(45) Date of Patent: Mar. 8, 2016

(54) IMPLEMENT POSITION CONTROL SYSTEM HAVING AUTOMATIC CALIBRATION

(71) Applicant: CATERPILLAR INC., Peoria, IL (US)

(72) Inventors: Troy Kenneth Becicka, Sahuarita, AZ (US); Paul Russell Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/476,492

(22) Filed: Sep. 3, 2014

(51) Int. Cl.
G06F 19/00 (2011.01)
E02F 9/20 (2006.01)

(52) U.S. Cl.
CPC ................................. *E02F 9/2029* (2013.01)

(58) Field of Classification Search
None
See application file for complete search history.

(56) References Cited

U.S. PATENT DOCUMENTS

| | | | |
|---|---|---|---|
| 6,062,317 A | 5/2000 | Gharsalli et al. | |
| 6,191,732 B1 * | 2/2001 | Carlson | E02F 3/842 342/357.3 |
| 6,253,160 B1 * | 6/2001 | Hanseder | E02F 3/435 342/357.27 |
| 7,714,993 B2 | 5/2010 | Cain et al. | |
| 8,634,991 B2 | 1/2014 | Douglas | |
| 2010/0023228 A1 | 1/2010 | Montgomery | |
| 2011/0213529 A1 | 9/2011 | Krause et al. | |
| 2012/0239258 A1 | 9/2012 | Konno et al. | |

* cited by examiner

*Primary Examiner* — Thomas Tarcza
*Assistant Examiner* — Garrett Evans
(74) *Attorney, Agent, or Firm* — Finnegan, Henderson, Farabow, Garrett & Dunner, LLP

(57) ABSTRACT

A method, system, and non-transitory computer-readable storage medium for calibrating an implement actuation sensor of a machine are disclosed. The method may include calculating a first elevation value of an implement of the machine in a gravity reference frame of the machine. The method may further include calculating a second elevation value of a ground-engaging device of the machine in the gravity reference frame of the machine. The method may further include determining a difference between the first elevation value and the second elevation value. The method may further include calibrating the implement actuation sensor based on the determined difference.

20 Claims, 6 Drawing Sheets

IMPLEMENT POSITION CONTROL SYSTEM HAVING AUTOMATIC CALIBRATION

TECHNICAL FIELD

The present disclosure relates generally to an implement position control system and, more particularly, to an implement position control system having automatic calibration of the implement position sensors in the implement position control system.

BACKGROUND

Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task.

Earthmoving machines such as track type tractors, motor graders, scrapers, and/or backhoe loaders, have an implement such as a dozer blade or bucket, and need continuous adjustment for their operations. For example, the dozer blade or bucket must be adjusted on a worksite in order to alter a geography or terrain of a section of earth. The implement may be controlled by an operator or by a control system to perform work on the worksite such as achieving a final surface contour or a final grade on the worksite. The determination of an absolute 3-D position of the implement cutting edge (e.g., blade cutting edge) is critical for the implement to achieve the desired results.

Conventionally, an implement control system may include a 3-D positioning sensor (e.g. a Global Positioning System (GPS)) attached to the chassis of the machine. In this configuration, actuator position sensors measure displacement of the implement actuators (e.g. hydraulic cylinders) and these sensor outputs are used to calculate the position of the implement cutting edge with respect to the machine chassis (i.e. in a local coordinate frame). Such calculations are, however, highly dependent on precise calibration of the actuator position sensors.

U.S. Pat. No. 6,253,160 to Hanseder ("the '160 patent") discloses an arrangement for calibrating a tool positioning mechanism. The tool positioning mechanism includes a plurality of encoders, which indicate the position of the tool (e.g., a bucket). The encoders are calibrated by mounting a first GPS antenna on the tool and resolving a vector between the first antenna and a second antenna mounted on another portion of the chassis of the machine. Calibration is accomplished by setting the outputs of the encoders to a predetermined value, such as a full-range, which is measured using the vector when the tool is fully extended.

While the '160 patent may provide a useful way to calibrate a tool positioning mechanism, precise calibration may be challenging because the tool positioning mechanism may only work if the machine is placed on a flat surface, which would be difficult if the calibration has to be done in the field.

The implement position control system of the present disclosure is directed toward solving one or more of the problems set forth above and/or other problems of the prior art.

SUMMARY

In one aspect, the present disclosure is directed to a method for calibrating an implement actuation sensor of a machine. The method may include calculating a first elevation value of an implement of the machine in a gravity coordinate frame of the machine. The method may further include calculating a second elevation value of a ground-engaging device of the machine in the gravity coordinate frame of the machine. The method may further include determining a difference between the first elevation value and the second elevation value. The method may further include calibrating the implement actuation sensor based on the determined difference.

In another aspect, the present disclosure is directed to a non-transitory computer-readable storage medium storing instructions that enable a computer to execute a method for calibrating an implement actuation sensor of a machine. The method may include calculating a first elevation value of an implement of the machine in a gravity coordinate frame of the machine. The method may further include calculating a second elevation value of a ground-engaging device of the machine in the gravity coordinate frame of the machine. The method may further include determining a difference between the first elevation value and the second elevation value. The method may further include calibrating the implement actuation sensor based on the determined difference.

In another aspect, the present disclosure is directed to an implement position control system in a machine. The system may include an implement actuation sensor corresponding to an implement of the machine, and a controller in communication with the implement actuation sensor. The controller may be configured to calculate a first elevation value of the implement in a gravity coordinate frame of the machine, and calculate a second elevation value of a ground-engaging device of the machine in the gravity coordinate frame of the machine. The controller may be further configured to determine a difference between the first elevation value and the second elevation value, and calibrate the implement actuation sensor based on the determined difference.

DETAILED DESCRIPTION

Figure 1:
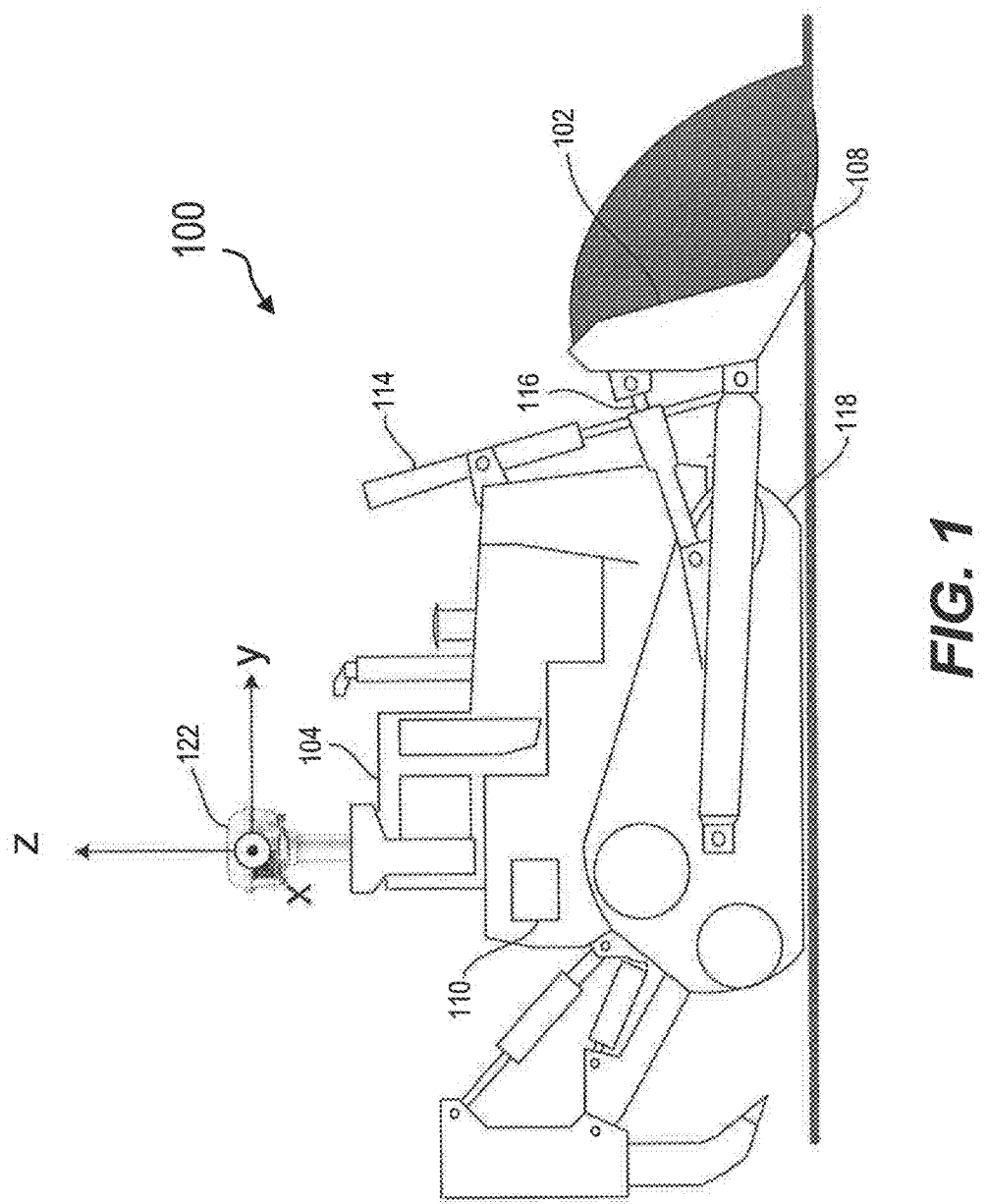
FIG. 1 is a diagrammatic illustration of an exemplary disclosed machine.

FIG. 1 illustrates a pictorial view of an earth-moving machine 100 (also referred to herein as "machine 100") having an earth moving implement 102. The earth-moving implement 102 (also referred to herein as "implement 102"), having a cutting edge 108, may be utilized to move earth or soil. For illustrative purposes, the earth-moving machine 100 is shown as a track-type bulldozer and the earth-moving implement 102 is shown as a bulldozer blade. It will be apparent that exemplary aspects of the present disclosure may be utilized by any machine including other earth-moving machines, such as other track or wheel-type machines.

Machine 100 may include a power source (not shown), an operator's station or cab 104 containing controls necessary to operate machine 100, such as, for example, one or more input devices for propelling the machine 100 or controlling other machine components. The power source may be an engine that provides power to a ground engaging mechanism 118 (e.g., tracks 118) adapted to support, steer, and propel machine 100. The one or more input devices may include one or more joysticks disposed within cab 104 and may be adapted to receive input from an operator indicative of a desired movement of implement 102. Cab 104 may also include a user interface having a display for conveying information to the operator and may include a keyboard, touch screen, or any suitable mechanism for receiving input from the operator to control and/or operate machine 100, implement 102, and/or the other machine components.

Implement 102 may be moveable by one or more hydraulic mechanisms operatively connected to the input device in cab 104. The hydraulic mechanisms may include one or more hydraulic lift actuators 114 and one or more hydraulic tilt actuators 116 for moving implement 102 in various positions, such as, for example, lifting implement 102 up or lowering implement 102 down, tilting implement 102 left or right, or pitching implement 102 forward or backward. In the illustrated embodiment, machine 100 may include one hydraulic lift actuator 114 and one hydraulic tilt actuator 116 on each side of implement 102.

Machine 100 may further include a frame or rigid body disposed between implement 102 and tracks 118. A position determining system 122 adapted to receive and process position data or signals may be mounted to the rigid body of machine 100. In the exemplary embodiments described herein, the position determining device 122 may be a global position satellite (GPS) system receiver. Accordingly, at many places in this disclosure, the position determining device 122 is also referred to as GPS 122. The GPS receiver, as is well known in the art, receives signals from a plurality of satellites and responsively determines a position of the receiver in a coordinate system relative to the worksite, that is, in a site coordinate system. The site coordinate system may be a Cartesian system having an x-coordinate, a y-coordinate, and a z-coordinate. In alternative embodiments, position determining system 122 may include other types of positioning systems without departing from the scope of this disclosure, such as, for example, laser referencing systems.

Figure 2:
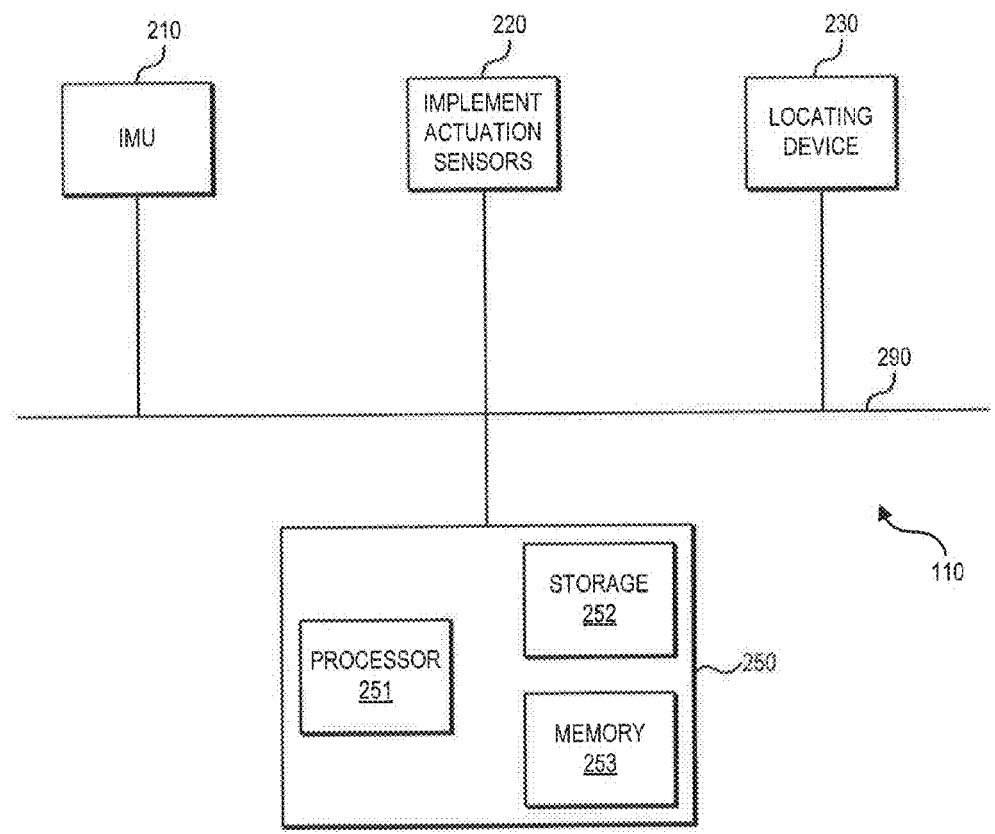
FIG. 2 is a diagrammatic illustration of an exemplary disclosed implement position control system that may be used in conjunction with the machine of FIG. 1.

FIG. 2 illustrates an implement position control system 110 that may be integrated with machine 100. Implement position control system 110 may include an IMU 210, implement actuation sensors 220, a locating device 230, and controller 250. Implement position control system 110 may be adapted to control or direct the movement of implement 102 based on the inputs from the input devices in cab 104, IMU 210, implement actuation sensors 220, a locating device 230, and controller 250. In particular, the above sensors and controller 250 may be connected to each other via a bus 290 and controller 250 may control or direct movement of implement 102 by controlling extension of hydraulic lift actuators 114 and hydraulic tilt actuators 116. While a bus architecture is shown in FIG. 2, any suitable architecture may be used, including any combination of wired and/or wireless networks. Additionally, such networks may be integrated into any local area network, wide area network, and/or the Internet.

IMU 210 may include any device (such as a gyroscope) capable of measuring an angular rate (e.g., a yaw rate, pitch rate, roll rate) of machine 100 and producing a corresponding signal. Exemplarily, IMU 210 may include a 3-axis angular rate gyro that provides signals indicative of the pitch rate, yaw rate, and roll rate of machine 100. IMU 210 may also include one or more accelerometers and/or pendulous-based inclinometers capable of measuring the acceleration of machine 100 along one or more axes. The accelerometers may provide acceleration of machine 100 along a forward axis, and such acceleration values may be utilized to determine a pitch of machine 100. Similarly, the accelerometers may provide acceleration of machine 100 along a side axis and such acceleration values may be utilized to determine a roll of machine 100.

Implement actuation sensors 220 may provide extension values for hydraulic lift actuators 114 and hydraulic tilt actuators 116. Exemplarily, implement actuation sensors 220 may provide an offset of cutting edge 108 from the machine origin. For example, if machine origin is the location of GPS 122, implement actuation sensors 220 may provide a 3-dimensional offset of edge 108 from GPS 122 based on the extensions of hydraulic lift actuators 114 and hydraulic tilt actuators 116.

Locating device 230 may include any device capable of providing a signal that indicates machine 100's location. Exemplarily, locating device 230 may include position determining system 122, which is shown in FIG. 1 as embodying a global satellite system device (e.g., a GPS device). Locating device 230 may be configured to convey a signal indicative of the received or determined positional information to one or more of interface devices for display of machine location. The signal may also be directed to controller 250 for further processing. In the exemplary embodiments discussed herein, locating device 230 provides a GPS signal as the location signal indicative of the location of machine 100. However, it will be understood by one of ordinary skill in the art that the disclosed exemplary embodiments could be modified to utilize other indicators of the location of machine 100, if desired.

Controller 250 may include a processor 251, a storage 252, and a memory 253, assembled together in a single device and/or provided separately. Processor 251 may include one or more known processing devices, such as a microprocessor from the Pentium™ or Xeon™ family manufactured by Intel™, the Turion™ family manufactured by AMD™, or any other type of processor. Memory 253 may include one or more storage devices configured to store information used by the controller 250 to perform certain functions related to disclosed embodiments. Storage 252 may include a volatile or non-volatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

In one exemplary embodiment, memory 253 may include one or more implement position control programs or subprograms loaded from storage 252 or elsewhere that, when executed by processor 251, perform various procedures, operations, or processes consistent with disclosed embodiments. For example, memory 253 may include one or more programs that enable controller 250 to, among other things, collect data from the above-mentioned units and process the data according to disclosed embodiments such as those embodiments discussed with regard to FIGS. 3, 4, 5, and 6 and control a position of implement 102 based on the processed data.

To control implement 102, controller 250 (more particularly, processor 251) may calibrate implement actuation sensors 220 by comparing, for example, the elevation of implement 102 with the elevation of tracks 118 at the same location along machine 100's direction of travel. When implement 102 is loaded and machine 100 is moving forward, the elevation of tracks 118 and implement 102 is expected be the same at the same location along machine 100's direction of travel. Accordingly, controller 250 may calibrate the implement actuation sensors 220 by comparing the elevation of implement 102 and elevation of a selected point on tracks 118. The next few paragraphs describe how controller 250 may calculate the elevation of implement 102 and a selected point on tracks 118.

Figure 3:
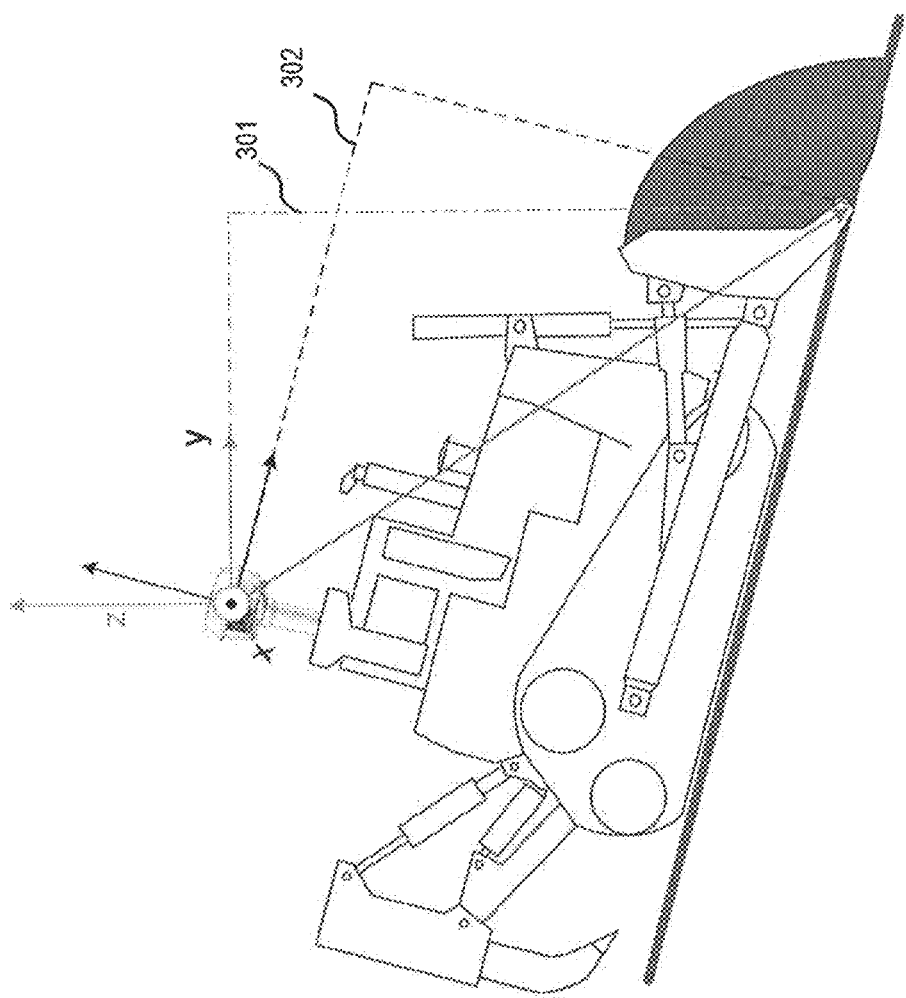
FIG. 3 is a diagrammatic illustration of a translation of an implement position from a local coordinate frame to a gravity coordinate frame.

An exemplary calculation of the elevation of implement 102 is discussed with reference to FIG. 3. In FIG. 3, the reference numerals from FIG. 1 are not repeated but it will be understood that same elements between FIGS. 3 and 1 have same reference numerals. As seen in FIG. 3, machine 100 is traveling downhill. Accordingly, the gravity coordinate frame 301 (also referred to herein as "GPS coordinate frame 301") and the local coordinate frame 302 (also referred to herein as "body coordinate frame 302") are different. Implement actuation sensors 220 may provide to controller 250 an offset of cutting edge 108 from the machine origin (e.g., location of GPS 122) in the longitudinal (y) axis, vertical (z) axis, and horizontal (x) axis of the local coordinate frame 302. For ease of reference, these offsets can be grouped into a 3 by 1 (3×1) vector and referred to as $I_{MACH}$. It may be desirable to compute the elevation of implement 102 in the gravity or GPS coordinate frame 301, i.e., calculate the absolute elevation of implement 102. Accordingly, vector $I_{MACH}$ may be translated into the GPS coordinate frame 301 by utilizing the orientation of machine 100 (e.g., the yaw, pitch, and roll of machine 100) and well-known rotation matrices. It will be understood that controller 250 may determine the orientation of machine 100 (e.g., the yaw, pitch, and roll of machine 100) using data received from IMU 210 and locating device 230. For example, controller 250 may utilize a Kalman filter to determine the orientation of machine 100. Further details regarding the orientation calculation are not provided because any well-known technique may be used to calculate the orientation of machine 100. Assuming that pitch is denoted by β, roll is denoted by γ, and yaw is denoted by α, the following exemplary equation may be utilized by controller 250 to translate $I_{MACH}$ from local coordinate frame 302 to GPS coordinate frame 301:

$$I_{GPS} = R_Z(\text{yaw}) * R_Y(\text{roll}) * R_X(\text{pitch}) * I_{MACH} \qquad (1)$$

where $$R_Z(\text{yaw}) = \begin{pmatrix} \cos\alpha & -\sin\alpha & 0 \\ \sin\alpha & \cos\alpha & 0 \\ 0 & 0 & 1 \end{pmatrix} \qquad (2)$$

$$R_Y(\text{roll}) = \begin{pmatrix} 1 & 0 & 0 \\ 0 & \cos\gamma & -\sin\gamma \\ 0 & \sin\gamma & \cos\gamma \end{pmatrix} \qquad (3)$$

$$R_X(\text{pitch}) = \begin{pmatrix} \cos\beta & 0 & \sin\beta \\ 0 & 1 & 0 \\ -\sin\beta & 0 & \cos\beta \end{pmatrix} \qquad (4)$$

Controller 250 may determine the absolute elevation of cutting edge 108 by simply adding the elevation of GPS 122, which is already in the GPS coordinate frame, to the elevation component in $I_{GPS}$ (e.g., z-component in $I_{GPS}$). The elevation of GPS 122 may be readily available based on the data received by GPS 122.

Figure 4:
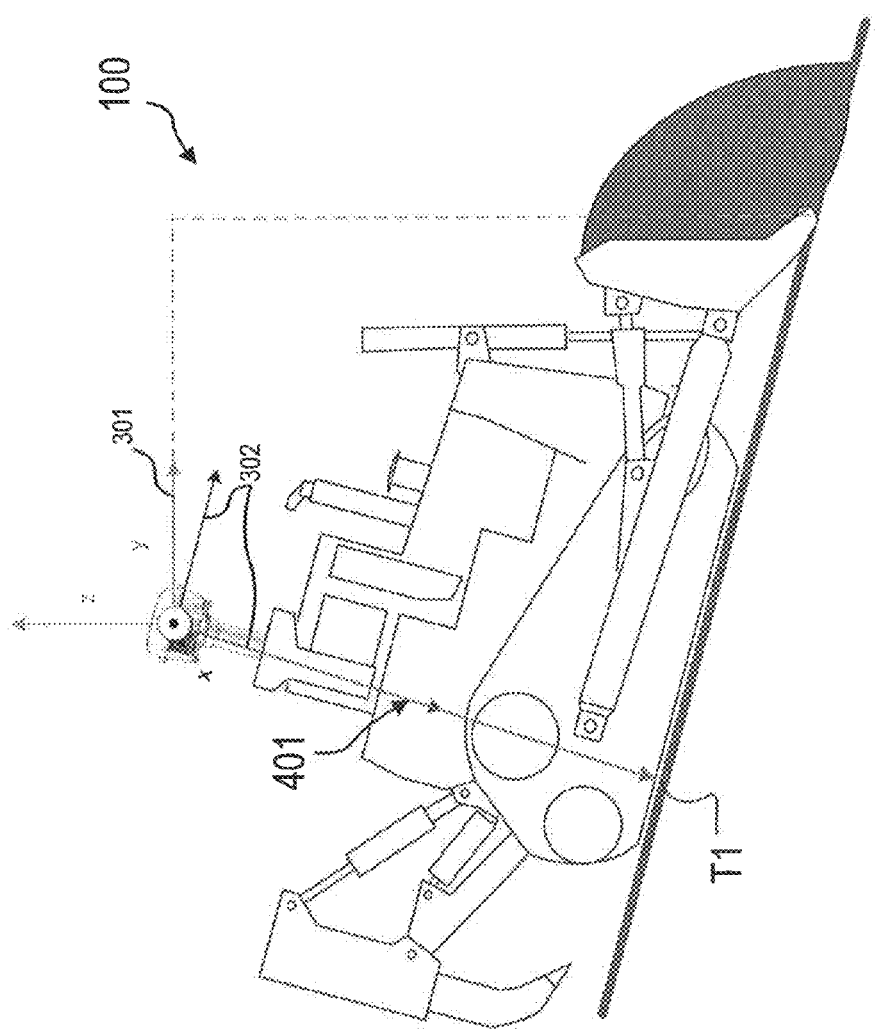
FIG. 4 is a diagrammatic illustration of a translation of a track position from a local coordinate frame to a gravity coordinate frame.

The above calculation may occur based on the left or right cutting edge 108 crossing a given location (e.g., 'y1'). A similar calculation may be carried out by controller 250 for a predetermined point (e.g., 'T1') on tracks 118 when the predetermined point crosses location y1. This calculation is now described with reference to FIG. 4. In FIG. 4, the reference numerals from FIG. 1 are not repeated but it will be understood that same elements between FIGS. 4 and 1 have same reference numerals. To determine elevation of point T1 on tracks 118 when T1 crosses y1, controller 250 may determine a fixed vector 401 between the origin (e.g., GPS 122) of local coordinate frame 302 and point T1. As vector 401 may be fixed, it may be readily obtained by controller 250 from, for example, memory 253. Vector 401 (say '$V_{MACH}$') may be translated into GPS coordinate frame 301 using the following equation, which is similar to equation (1):

$$V_{GPS} = R_Z(\text{yaw}) * R_Y(\text{roll}) * R_X(\text{pitch}) * V_{MACH} \qquad (5)$$

The rotation matrices in equation (5) are the same as those described in equations (2)-(4). Also, for purposes of equation (5), controller 250 may utilize the orientation values at the time of point T1 crossing y1 or it may utilize the orientation values that were used to calculate the implement elevation in equation (1). Controller 250 may determine the absolute elevation of point T1 by simply adding the elevation of GPS 122, which is already in the GPS coordinate frame, to the elevation component in $V_{GPS}$ (e.g., z-component in $V_{GPS}$). The elevation of GPS 122 may be readily available based on the data received by GPS 122.

To calibrate implement actuation sensors 220, controller 250 may compare the absolute elevation of point T1 (which may suggest the elevation of tracks 118) with the absolute elevation of cutting edge 108 (which can be thought of as indicating the elevation of implement 102). The difference between the elevation of tracks 118 and implement 102 could be averaged over time, where a running average of zero would indicate acceptable calibration of implement actuation sensors 220. Controller 250 may alert the end user that the system is out of calibration if the difference exceeds a threshold, or it may automatically adjust the implement actuation sensor calibration values in a closed-loop manner to compensate for the elevation difference between the implement 102 and tracks 118.

Figure 5A:
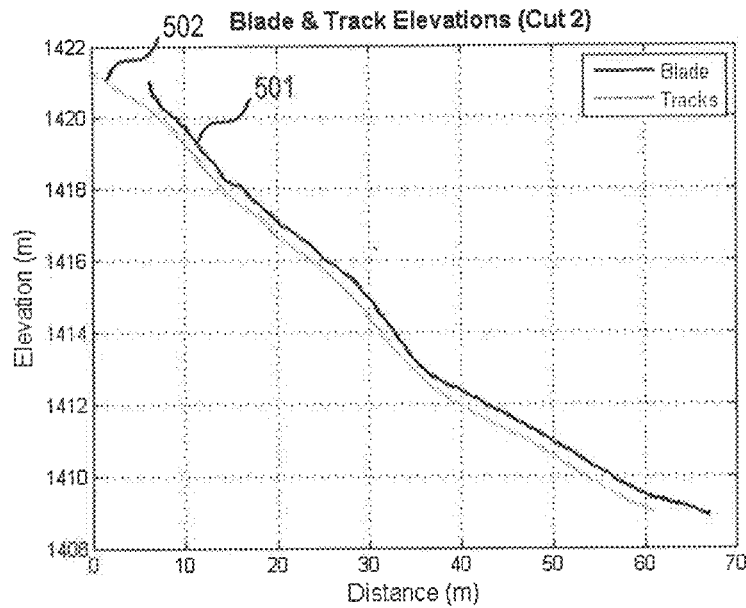
FIGS. 5A and 5B are exemplary results before and after the calibration of the implement actuation sensors.
Figure 5B:
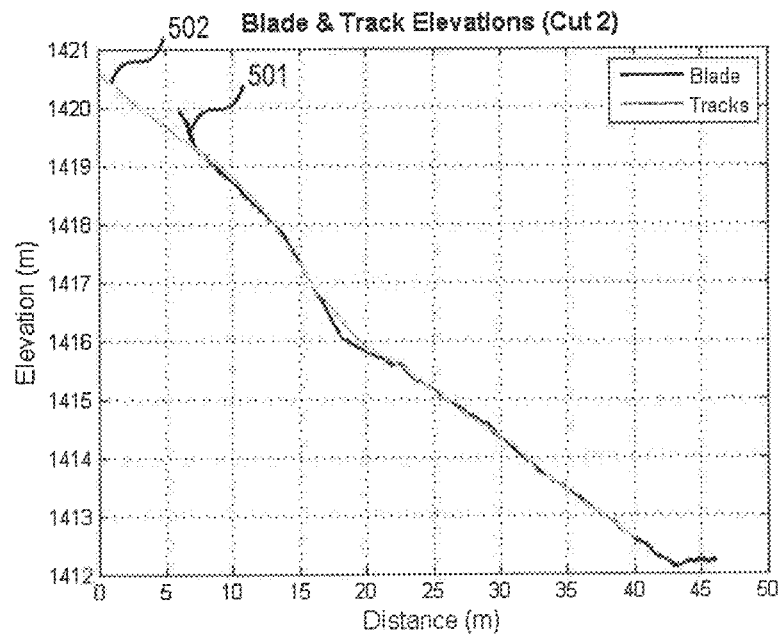

FIGS. 5A and 5B illustrate exemplary results before and after calibration of implement actuation sensors 220. As seen from FIG. 5A, there is a difference in the elevation value 501 for implement 102 and elevation value 502 for tracks 118 at the same corresponding ground location, as determined by controller 250. FIG. 5B illustrates the elimination of this elevation difference post-calibration using the above-disclosed techniques. As seen from FIG. 5B, the elevation value 501 for implement 102 and elevation value 502 for tracks 118 at the same corresponding ground location closely track each other.

Figure 6:
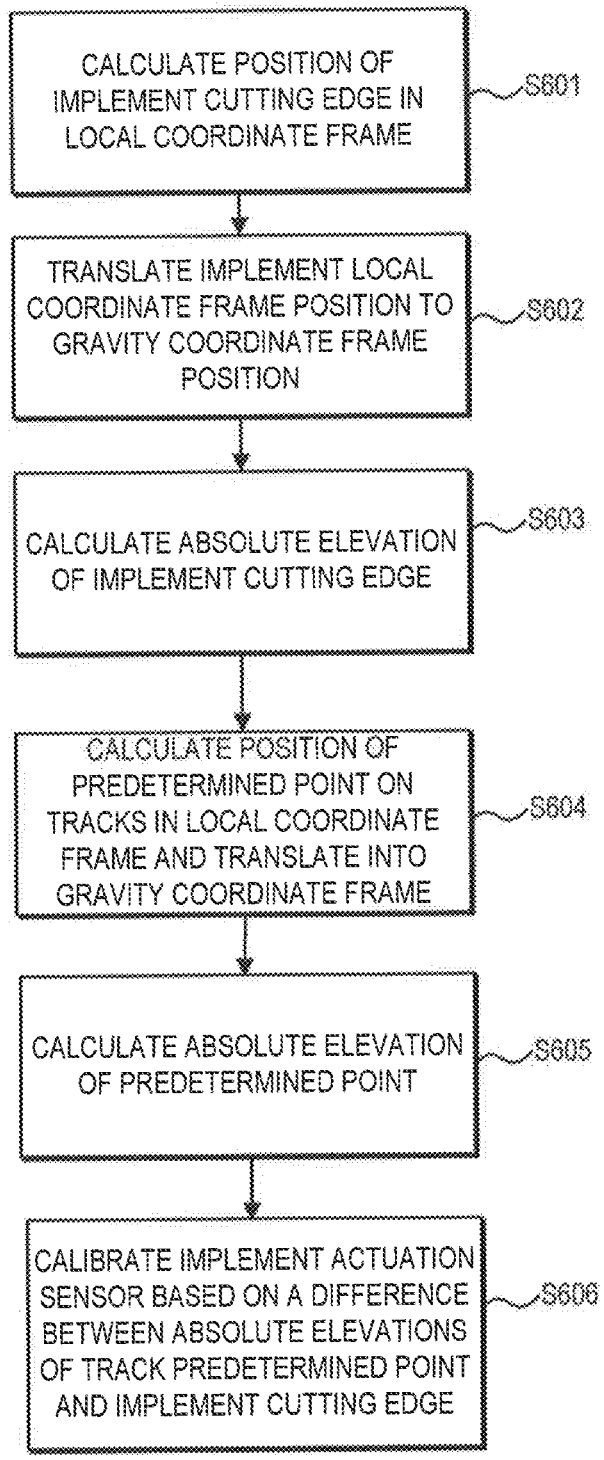
FIG. 6 is a flowchart illustrating an exemplary method performed by the disclosed implement position control system.

FIG. 6 further describes exemplary operations of controller 250 to calibrate implement actuation sensors 220. A detailed description of FIG. 6 is provided in the next section.

INDUSTRIAL APPLICABILITY

The disclosed implement position control system 110 may be applicable to any machine where accurate detection of an implement's elevation is desired. The disclosed implement position control system 110 may provide for improved estimation of implement 102's elevation by comparing the elevation of implement 102 indicated by the implement actuation sensors with the elevation of the tracks measured utilizing the pose-system (e.g., locating device 230 and/or IMU 210). Operation of the implement position control system 110 will now be described in connection with the exemplary flowchart of FIG. 6.

FIG. 6 illustrates an exemplary flowchart to calibrate implement actuation sensors 220 to allow for accurate position control of implement 102. In step 601, controller 250 may calculate a position of implement cutting edge 108 in local coordinate frame 302. Implement actuation sensors 220 may provide to controller 250 an offset of cutting edge 108 from the machine origin (e.g., location of GPS 122) in the longitudinal (y) axis, vertical (z) axis, and horizontal (x) axis of the local coordinate frame 302. As discussed above, these offsets can be grouped into a 3 by 1 (3×1) vector and referred to as $I_{MACH}$, which may denote the position of implement cutting edge 108 in local coordinate frame 302.

In step 602, controller 250 may translate the implement local coordinate frame position calculated in step 601 to a gravity coordinate frame position. It may be desirable to compute the elevation of implement 102 in the gravity or GPS coordinate frame 301, i.e., calculate the absolute elevation of implement 102. Accordingly, vector $I_{MACH}$ may be translated into the GPS coordinate frame 301 by utilizing the orientation of machine 100 (e.g., the yaw, pitch, and roll of machine 100) and well-known rotation matrices. Assuming that pitch is denoted by β, roll is denoted by γ, and yaw is denoted by α, the following exemplary equation may be utilized by controller 250 to translate $I_{MACH}$ from local coordinate frame 302 to GPS coordinate frame 301:

$$I_{GPS} = R_Z(\text{yaw}) * R_Y(\text{roll}) * R_X(\text{pitch}) * I_{MACH} \quad (1)$$

The rotation matrices $R_Z$, $R_Y$, and $R_X$ were described above and hence, their description is omitted here. $I_{GPS}$ is now the implement position in the gravity or GPS coordinate frame 301. More specifically, $I_{GPS}$ is the position of implement cutting edge 108 in GPS coordinate frame 301.

In step 603, controller 250 may calculate absolute elevation of implement cutting edge 108. Controller 250 may determine the absolute elevation of cutting edge 108 by simply adding the elevation of GPS 122, which is already in the GPS coordinate frame, to the elevation component in $I_{GPS}$ (e.g., z-component in $I_{GPS}$). The elevation of GPS 122 may be readily available based on the data received by GPS 122.

In step 604, controller 250 may calculate the position of a predetermined point on tracks 118 and translate this calculated position from local coordinate frame 302 into gravity coordinate frame 301. As shown in FIG. 4, the predetermined point may be T1 on tracks 118. Controller may implement this calculation for T1 when T1 crosses location y1, which is the location crossed by cutting edge 108 at the time of step 601. To determine elevation of point T1 on tracks 118 when T1 crosses y1, controller 250 may determine a fixed vector 401 between the origin (e.g., GPS 122) of local coordinate frame 302 and point T1. As vector 401 may be fixed, it may be readily obtained by controller 250 from, for example, memory 253. Vector 401 (say '$V_{MACH}$') may be translated into the GPS coordinate frame 301 using the following equation, which is similar to equation (1):

$$V_{GPS} = R_Z(\text{yaw}) * R_Y(\text{roll}) * R_X(\text{pitch}) * V_{MACH} \quad (5)$$

The rotation matrices in equation (5) are the same as those described in equations (2)-(4). Also, for purposes of equation (5), controller 250 may utilize the orientation values at the time of point T1 crossing y1 or it may utilize the orientation values that were used to calculate the implement elevation in equation (1).

In step 605, controller 250 may calculate the absolute elevation of predetermined point T1. Controller 250 may determine the absolute elevation of point T1 by simply adding the elevation of GPS 122, which is already in the GPS coordinate frame, to the elevation component in $V_{GPS}$ (e.g., z-component in $V_{GPS}$). The elevation of GPS 122 may be readily available based on the data received by GPS 122.

In step 606, controller 250 may calibrate implement actuation sensors 220 based on a difference between absolute elevations of T1 and implement cutting edge 108. To calibrate implement actuation sensors 220, controller 250 may compare the absolute elevation of point T1 (which may suggest the elevation of tracks 118) with the absolute elevation of cutting edge 108 (which can be thought of as indicating the elevation of implement 102). The difference between the elevation of tracks 118 and implement 102 could be averaged over time, where a running average of zero would indicate good calibration of implement actuation sensors 220. Controller 250 may alert the end user that the system is out of calibration if the difference exceeds a threshold, or it may automatically adjust the implement actuation sensor calibration values in a closed-loop manner to compensate for the elevation difference between implement 102 and tracks 118.

The disclosed exemplary embodiments may allow for an accurate calibration of the implement actuation sensor and hence, allow for a more accurate positioning and control of the implement of machine 100. For example, the disclosed exemplary embodiments may allow for calibration of the implement actuation sensors on the field even when the ground surfaces are uneven. Furthermore, the disclosed exemplary embodiments may allow accounting for the wearing of the implement. For example, the disclosed exemplary embodiments may be used to account for blade wear in an earth-moving machine.

It will be apparent to those skilled in the art that various modifications and variations can be made to the disclosed embodiments. Other embodiments will be apparent to those skilled in the art from consideration of the specification and practice of the disclosed embodiments. It is intended that the specification and examples be considered as exemplary only, with a true scope being indicated by the following claims.

What is claimed is:

1. A method for calibrating an implement actuation sensor of a machine, comprising:
    calculating a first elevation value of an implement of the machine in a gravity coordinate frame of the machine when an implement cutting edge of the implement is at an elevation calculation location on an axis of the gravity coordinate frame;
    calculating a second elevation value of a ground-engaging device of the machine in the gravity coordinate frame of the machine when a predetermined point on the ground engaging device is at the elevation calculation location on the axis of the gravity coordinate frame;
    determining a difference between the first elevation value and the second elevation value; and
    calibrating the implement actuation sensor based on the determined difference.

2. The method of claim 1, wherein calculating the first elevation value includes:
    calculating an offset of the implement cutting edge from an origin in a local coordinate frame of the machine, and
    translating the offset from the local coordinate frame to the gravity coordinate frame of the machine.

3. The method of claim 2, wherein the offset is a 3-dimensional offset and is calculated using values output by the implement actuation sensor.

4. The method of claim 3, wherein translating the offset includes:
- calculating an orientation of the machine, and
- translating the offset from the local coordinate frame to the gravity coordinate frame using the calculated orientation.

5. The method of claim 4, wherein the origin is the location of a GPS receiver and the first elevation value is calculated by adding a third elevation value of the GPS receiver to an elevation component in the translated offset of the implement cutting edge.

6. The method of claim 1, wherein calculating the second elevation value includes:
- calculating an offset of the predetermined point on the ground-engaging device from an origin in a local coordinate frame of the machine, and
- translating the offset from the local coordinate frame to the gravity coordinate frame of the machine.

7. The method of claim 6, wherein translating the offset includes:
- calculating an orientation of the machine, and
- translating the offset from the local coordinate frame to the gravity coordinate frame using the calculated orientation.

8. The method of claim 7, wherein the orientation of the machine includes a pitch, roll, and yaw of the machine.

9. The method of claim 8, wherein the origin is the location of a GPS receiver and the second elevation value is calculated by adding a third elevation value of the GPS receiver to an elevation component in the translated offset of the predetermined point.

10. An implement position control system in a machine, comprising:
- an implement actuation sensor corresponding to an implement of the machine; and
- controller in communication with the implement actuation sensor, the controller configured to:
  - calculate an offset of an implement cutting edge from an origin in a local coordinate frame of the machine,
  - translate the offset from the local coordinate frame to the gravity coordinate frame of the machine,
  - calculate a first elevation value of the implement in a gravity coordinate frame of the machine, at least in part, as a function the translated offset,
  - calculate a second elevation value of a ground-engaging device of the machine in the gravity coordinate frame of the machine,
  - determine a difference between the first elevation value and the second elevation value, and
  - calibrate the implement actuation sensor based on the determined difference.

11. The system of claim 10, wherein the offset is a 3-dimensional offset and is calculated using values output by the implement actuation sensor.

12. The system of claim 11, wherein translating the offset includes:
- calculating an orientation of the machine, and
- translating the offset from the local coordinate frame to the gravity coordinate frame using the calculated orientation.

13. The system of claim 12, wherein the origin is the location of a GPS receiver and the first elevation value is calculated by adding a third elevation value of the GPS receiver to an elevation component in the translated offset of the implement cutting edge.

14. The system of claim 10, wherein calculating the second elevation value includes:
- calculating an offset of a predetermined point on the ground-engaging device from an origin in a local coordinate frame of the machine, and
- translating the offset from the local coordinate frame to the gravity coordinate frame of the machine.

15. The system of claim 14, wherein translating the offset includes:
- calculating an orientation of the machine, and
- translating the offset from the local coordinate frame to the gravity coordinate frame using the calculated orientation.

16. The system of claim 15, wherein the orientation of the machine includes a pitch, roll, and yaw of the machine.

17. The system of claim 16, wherein the origin is the location of a GPS receiver and the second elevation value is calculated by adding a third elevation value of the GPS receiver to an elevation component in the translated offset of the predetermined point.

18. A non-transitory computer-readable storage medium storing instructions that enable a computer to execute a method for calibrating an implement actuation sensor of a machine, the method comprising:
- calculating a first elevation value of an implement of the machine in a gravity coordinate frame of the machine, at least in part, as a function of a signal from the implement actuation sensor;
- calculating a second elevation value of a ground-engaging device of the machine in the gravity coordinate frame of the machine;
- determining a difference between the first elevation value and the second elevation value; and
- calibrating the implement actuation sensor based on the determined difference.

19. The non-transitory computer-readable storage medium of claim 18, wherein calculating the first elevation value includes:
- calculating an offset of an implement cutting edge from an origin in a local coordinate frame of the machine, and
- translating the offset from the local coordinate frame to the gravity coordinate frame of the machine.

20. The system of claim 19, wherein the origin is the location of a GPS receiver and the second elevation value is calculated by adding a third elevation value of the GPS receiver to an elevation component in the translated offset of the predetermined point.

* * * * *